US 6,615,348 B1

(12) United States Patent
Gibbs

(10) Patent No.: US 6,615,348 B1
(45) Date of Patent: Sep. 2, 2003

(54) METHOD AND APPARATUS FOR AN ADAPTED DIGITAL SIGNATURE

(75) Inventor: Benjamin K. Gibbs, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,131

(22) Filed: Apr. 16, 1999

(51) Int. Cl.[7] ................................................. H04L 9/00
(52) U.S. Cl. .................... 713/162; 380/28; 380/264; 713/153; 713/155; 713/176; 713/190; 713/201
(58) Field of Search .................... 380/28, 264; 713/153, 713/155, 162, 176, 190, 201

(56) References Cited

U.S. PATENT DOCUMENTS

| 4,281,215 A | 7/1981 | Atalla | 178/22.08 |
| 4,309,569 A | 1/1982 | Merkle | 178/22.08 |
| 4,405,829 A | 9/1983 | Rivest et al. | 178/22.1 |

(List continued on next page.)

FOREIGN PATENT DOCUMENTS

| WO | WO 97/46962 | 12/1997 | G06F/17/60 |
| WO | WO 97/49251 | 12/1997 | H04N/11/00 |
| WO | WO 98/00787 | 1/1998 | G06F/13/00 |
| WO | WO 98/18249 | 4/1998 | H04L/29/06 |
| WO | WO 98/37680 | 8/1998 | |
| WO | WO 98/51064 | 11/1998 | H04M/3/42 |
| WO | WO 98/51116 | 11/1998 | H04Q/11/04 |
| WO | WO 99/04344 | 1/1999 | G06F/13/00 |

OTHER PUBLICATIONS

A. Arensburger, et al., To Take Arms Against a Sea of Email, Communication of the ACM, Mar. 1995, vol. 38, No. 3, pp. 108–109.

T. Bass, et al., A Simple Framework for Filtering Queued SMTP Mail (Cyberwar Countermeasures), MILCOM 97 Proceedings, Nov. 5, 1997, vol. 3, pp. 1140–1144.

M. Wagner, Cyber Junk, Computerworld, Aug. 26, 1996, vol. 30, No. 35, p. 28.

B. Cole–Gomolski, Message Managers Aim to Control Junk E–mail, Computerworld, May 5, 1997, vol. 31, No. 18.

G. Faulkner, A New and Nasty Way to Flood Networks with Spam, Lantimes, <http://www.lantimes.com/97/97sep/709c040a.html>, Sep. 1997.

P. Collinson, Putting a Stop to Spam, Centaur Communications EXE, Nov. 3, 1997.

Table of Contents, Choking on Spam, Nov. 1997, vol. 17, No. 13, p. 105.

(List continued on next page.)

Primary Examiner—Gilberto Barrón
Assistant Examiner—Paul E. Callahan
(74) Attorney, Agent, or Firm—Blakely, Sokoloff, Taylor & Zafman LLP

(57) ABSTRACT

A method and apparatus for an authenticated electronic userid comprising an adapted digital signature is provided. According to an aspect of the present invention, the adapted digital signature is generated using a secure hash function and an adaptation algorithm. According to one embodiment, a method for creating an adapted digital signature comprises retrieving an originator key, said originator key corresponding to a local userid; running a digital signature engine to create a digital signature, said digital signature based on at least said originator key and remote user information; retrieving a word from a word list, said word corresponding to at least a portion of said digital signature; and returning at least said word as said adapted digital signature.

16 Claims, 4 Drawing Sheets

U.S. PATENT DOCUMENTS

| | | | |
|---|---|---|---|
| 4,713,780 A | 12/1987 | Schultz et al. | 364/514 |
| 4,881,264 A | 11/1989 | Merkle | 380/25 |
| 4,934,846 A | 6/1990 | Gilham | 400/104 |
| 4,977,595 A | 12/1990 | Ohta et al. | 380/24 |
| 5,093,918 A | 3/1992 | Heyen et al. | 395/725 |
| 5,142,577 A | 8/1992 | Pastor | 380/21 |
| 5,204,961 A | 4/1993 | Barlow | 395/725 |
| 5,224,164 A | 6/1993 | Elsner | 380/44 |
| 5,231,668 A | 7/1993 | Kravitz | 380/28 |
| 5,307,412 A | 4/1994 | Vobach | 380/42 |
| 5,319,710 A | 6/1994 | Atalla et al. | 380/23 |
| 5,349,649 A | 9/1994 | Iijima | 395/275 |
| 5,351,293 A | 9/1994 | Michener et al. | 380/21 |
| 5,367,573 A | 11/1994 | Quimby | 380/25 |
| 5,371,796 A | 12/1994 | Avarne | 380/23 |
| 5,377,354 A | 12/1994 | Scannell et al. | 395/650 |
| 5,432,852 A | 7/1995 | Leighton et al. | 380/30 |
| 5,434,918 A | 7/1995 | Kung et al. | 380/25 |
| 5,473,691 A | 12/1995 | Menezes et al. | 380/25 |
| 5,479,514 A | 12/1995 | Klonowski | 380/47 |
| 5,493,692 A | 2/1996 | Theimer et al. | 455/26.1 |
| 5,537,475 A | 7/1996 | Micali | 380/30 |
| 5,539,826 A | 7/1996 | Dwork et al. | 380/25 |
| 5,542,046 A | 7/1996 | Carlson et al. | 395/186 |
| 5,592,553 A | 1/1997 | Guski et al. | 380/23 |
| 5,604,803 A | 2/1997 | Aziz | 380/25 |
| 5,606,668 A | 2/1997 | Shwed | 395/200.11 |
| 5,619,648 A | 4/1997 | Canale et al. | 395/200.01 |
| 5,638,446 A | 6/1997 | Rubin | 380/25 |
| 5,732,137 A | 3/1998 | Aziz | 380/25 |
| 5,740,361 A | 4/1998 | Brown | 395/187.01 |
| 5,751,813 A | 5/1998 | Dorenbos | 380/49 |
| 5,754,659 A | 5/1998 | Sprunk et al. | 380/30 |
| 5,764,772 A | 6/1998 | Kaufman et al. | 380/30 |
| 5,787,178 A | 7/1998 | Schwenk | 380/30 |
| 5,826,022 A | 10/1998 | Nielsen | 395/200.36 |
| 5,850,446 A | 12/1998 | Berger et al. | 380/24 |
| 5,852,665 A | 12/1998 | Gressel et al. | 380/30 |
| 5,857,022 A | 1/1999 | Sudia | 380/23 |
| 5,867,578 A | 2/1999 | Brickell et al. | 380/23 |
| 5,892,904 A | 4/1999 | Atkinson et al. | 395/187.01 |
| 5,943,426 A | 8/1999 | Frith et al. | 380/25 |
| 5,958,051 A | 9/1999 | Renaud et al. | 713/200 |
| 6,356,935 B1 * | 3/2002 | Gibbs | 709/206 |

OTHER PUBLICATIONS

Communications Software, Help Block Spam, Dec. 1997, vol. 10, No. 12, p. 286.

PC/Computing, Spam Killers, Dec. 1997, vol. 10, No. 12, p. 433.

D. Blankenhorn, Datamation, You Can Win The War Against Spam!, <http://www.datamation.com/PlugIn/issues/1998/august/08web.html>, Aug. 1998.

E. Gabber, et al., How to Make Personalized Web Browsing Simple, Secure, and Anonymous, Feb. 1997. pp. 1–16.

The Lucent Personalized Web Assistant, A Bell Labs Technology Demonstration, <http://www.bell-labs.com/projects/lpwa/>, on or after Jun. 1997, pp. 1–2.

News & Info, News Release, Lucent Technologies Introduces Technology That Protects Net Surfers' Privacy, <http://www.lucent.com/press/0697/9706.bla.html>, Jun. 10, 1997, pp. 1–2.

M. Stutz, WIREDNEWS, Covering Your Tracks via a Helping Hand, <http://www.zdnet.com/icom/news/199706/12/news2.htm>, Jun. 10, 1997, pp. 1–3.

Lucent Introduces Personal Protection Technology, News Watch, <http://www.zdnet.com/icom/news/199706/12news2.html>, Jun. 12, 1997, pp. 1–2.

a2i(rahul.net) anti–junk–email–features, <http://www.rahul.net/guest/nojunk.html>, 1998, pp. 1–2.

a2i–nojunk—anti–junk–email system, <http://www.rahul.net/gu7est/a2i–nojunk.1.txt>, date unknown, pp. 1–16.

L.F. Crano, et al., SPAM!, Communications of the ACM, Aug. 1998, vol. 41, No. 8, pp. 74–83.

L. Blum, et al., A Simple Unpredictable Pseudo–Random Number Generator, Siam Journal On COmputing, May 1986, vol. 15, No. 2, pp. 364–383.

Nist, The Digital Standard Signature Standard, Communications of the Law, Jul. 1992, vol. 35, No. 7, pp. 36–40.

C. Dwork, et al., Princing Via Processing or Combatting Junk Mail, Proc. of Crypto, Aug. 1992, pp. 39–145.

W. Diffie, The First Ten Years of Public–Key Cryptography, Proceedings of the IEEE, May 1988, pp. 560–577.

D. Bleichenbacher, On Secure and Pseudonymous Client–Relationships With Multiple Servers, May 28, 1998, pp. 1–14.

Y. Matias et al., Lightweight Security Primitives for E–Commerce, date unknown, pp. 1–8.

R.J. Hall, How to Avoid Unwanted Email, Communications of the ACM, Mar. 1998, vol. 41, No. 3, pp. 88–95.

R.J. Hall, Channels: Avoiding Unwanted Electronic Mail, American Mathematical Society, 1997, pp. 1–17.

E. Gabber, et al., Curbing Junk E–Mail via Secure Classification, in or after May 1998, pp. 1–12.

* cited by examiner

METHOD AND APPARATUS FOR AN ADAPTED DIGITAL SIGNATURE

FIELD OF THE INVENTION

This invention is related to the field of electronic messaging systems, and more particularly to a method and apparatus for creating an electronic userid.

BACKGROUND OF THE INVENTION

Junk e-mail or unsolicited bulk e-mail ("UBE"), referred to hereafter as "spam", has become a significant problem. Users of electronic messaging applications are barraged with spam on a daily basis by spammers (those who create and send spam). Spammers usually advertise sham wares, services, pyramid schemes, and, even worse, they send electronic viruses.

Spam has grown in popularity for a number of reasons. Primarily, it is a low cost and fast medium through which messages can be delivered. Further, the ease with which a spammer can harvest e-mail addresses, for example, from joke lists, newsgroups, web pages and cookies, provides a steadily expanding audience to which spam can be directed.

Filters have been proposed and a few developed that attempt to reduce or eliminate spam from a user's mail host and/or e-mail client.

One type of spam filter is a sender filter. The sender filter rejects all messages from an untrusted source, such as by way of an authorized or an unauthorized sender list. Inbound e-mail messages are simply rejected based upon the source of the message (e.g., the "from:" address of a message header). A major problem with the sender filter is that the sender's identity is frequently spoofed as either a random sender (which bypasses the unauthorized sender list) or as a sender unlikely to be rejected (which bypasses the authorized sender list.)

Another example of a spam filter is a context filter. A context filter examines a message body or a message subject header and removes messages based upon key words or phrases a spammer is likely to include in the message (e.g., "get rich", "work from home", "call now ", "porn", "xxx", etc.) A problem with context filters is that linguistic rules must be set up for a particular user in a particular environment. Moreover, language or context alone is inherently imprecise. Thus, context type filters generally suffer from an over-inclusiveness problem—meaning they filter more messages than they should because legitimate messages occasionally match the linguistic rules of the context filter.

Still another approach is the use of traditional encryption/decryption technology. Traditional encryption/decryption technology includes the use of shared encryption/decryption algorithms or keys (e.g., asymmetric or symmetric encryption). For example, in an asymmetric encryption/decryption system, a sender encrypts a message body using the intended recipient's public key. The recipient receives the encrypted message and decrypts it using her private key. A problem with this technique is that special equipment is required by both the sender and receiver—such as proprietary software or hardware. In a symmetric encryption solution, a secret key is shared between the sender and recipient. A problem here is that the shared key can easily be compromised. Moreover, encryption/decryption solutions can be computationally expensive and difficult to manage as compared to the low value of most e-mail messages. Some encryption/decryption solutions even require multiple handshaking and/or a real-time connection between the sender and receiver.

There is a need for a secure and trusted technique for identifying and filtering unauthorized electronic messages.

SUMMARY OF THE INVENTION

A method and apparatus for an adapted digital signature is provided. According to an aspect of the present invention, the adapted digital signature is generated using a digital signature engine and an adaptation algorithm.

According to one embodiment, a method for creating an adapted digital signature comprises: retrieving an originator key, the originator key corresponding to a local userid; running a digital signature engine to create a digital signature, the digital signature based on at least the originator key and remote user information; retrieving a word from a word list, the word indexed to at least a portion of the digital signature; and returning at least the word as the adapted digital signature.

According to another embodiment, a method for verifying an adapted digital signature comprises: retrieving an originator key based on a first portion of address information; generating an adapted digital signature based on the originator key and a second portion of the address information; comparing a third portion of the address information to the adapted digital signature; and accepting the electronic message if the third portion of the address information and the adapted digital signature match.

According to another embodiment, an electronic message system comprises: an authenticated message server configured to remove inbound electronic messages if an authenticated electronic userid cannot be verified; and a mail host coupled to the authenticated message server; and wherein the authenticated message server is configured to remove inbound electronic messages by performing the acts of: generating an adapted digital signature; comparing a portion of an inbound electronic message to the adapted digital signature; and rejecting the inbound electronic message if the portion of the inbound electronic message and the adapted digital signature do not match.

DETAILED DESCRIPTION OF THE PREFERRED EMBODIMENT

This application is related to U.S. patent application Ser. No. 09/133,875, filed Aug. 14, 1998, now U.S. Pat. No. 6,356,935, "APPARATUS AND METHOD FOR AN AUTHENTICATED ELECTRONIC USERID", issued Mar. 12, 2002 and 09/134,133, filed Aug. 14, 1998, now U.S. Pat. No. 6,085,321, "UNIQUE DIGITAL SIGNATURE", issued Jul. 4, 2000, which are incorporated herein by reference in their entirety.

Figure 1:
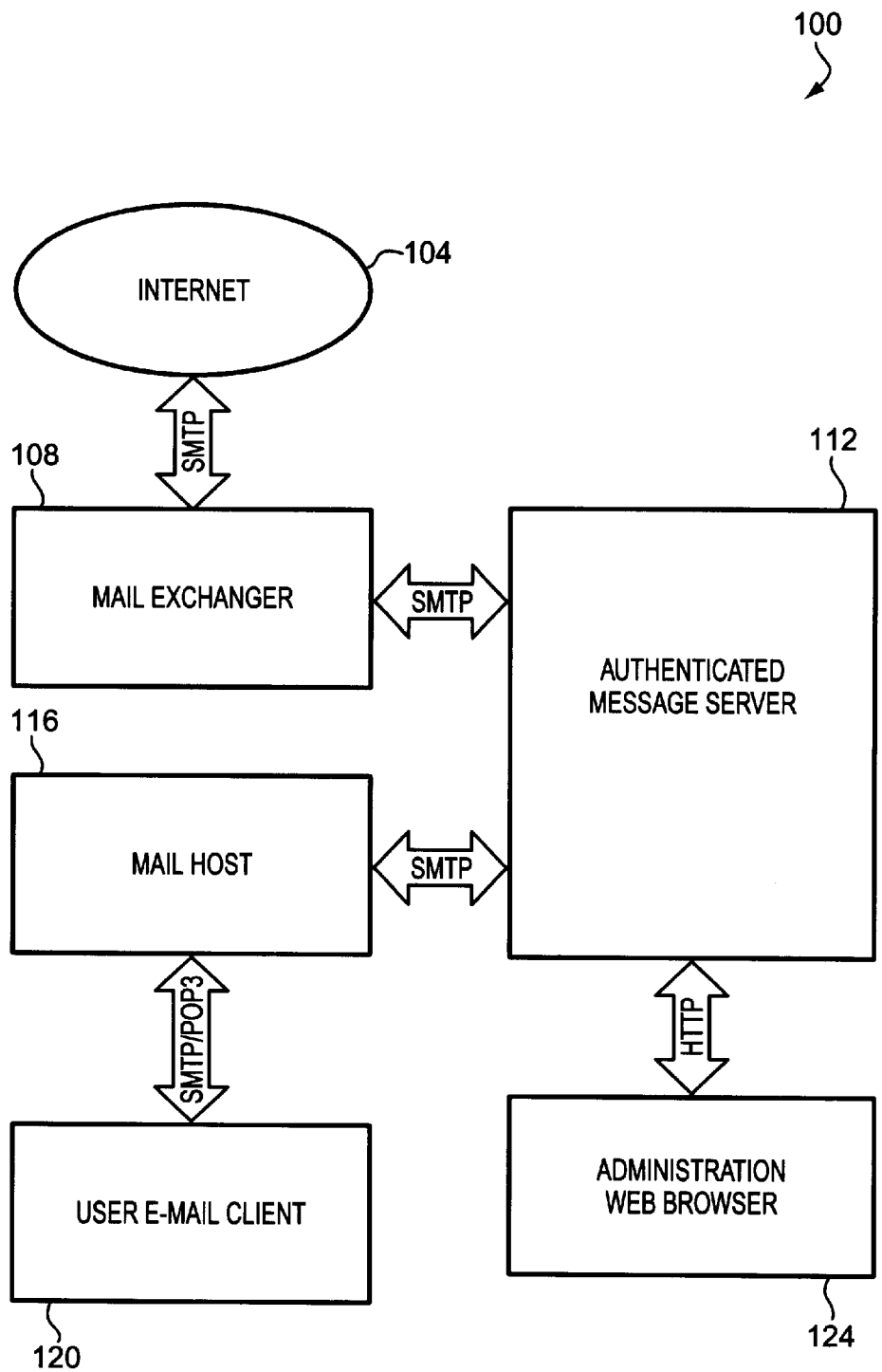
FIG. 1 depicts an overview of a presently preferred electronic messaging system.

FIG. 1 is an overview of a presently preferred electronic messaging system 100 employing the invention described herein. Internet 104 is a wide area network of interconnected computers. Connected to internet 104 via a simple mail transfer protocol ("SMTP") connection is a mail exchanger 108. (SMTP is further described in publicly available Internet Engineering Task Force (IETF) RFC821, "Simple Mail Protocol", Aug. 1982.) A mail exchanger, as used herein, is a server that transmits and receives electronic messages (e.g., e-mail) via the internet 104. The mail exchanger 108 resides in an internal network (e.g., a local area network). The mail exchanger 108 is the designated sender and receiver of e-mail between the internal network and the internet. For load balancing purposes, more than one mail exchanger 108 may service an internal network. The designation of a mail exchanger, such as mail exchanger 108, is preferably defined by a domain name server ("DNS") in a mail exchange record.

Optionally connected to authenticated message server 112 via a hyper text transfer protocol ("HTTP") link is an administration interface 124. (HTTP is further described in publicly available Internet IETF RFC 1945, "Hypertext Transfer Protocol—HTTP/1.0", May, 1996.) An administrator is able to configure the authenticated message server 112 via a web browser or equivalent device through data exchanges via HTTP and the administration interface 124.

Connected to authenticated message server 112 via an SMTP link is a mail host 116. Mail host 116 receives inbound e-mail messages and stores them for reading by a user. Mail host 116 can also send outbound e-mail messages created by the user. Because mail host 116 supports SMTP and post office protocol version 3 ("POP3), it can be embodied in virtually any mail server software, such as Microsoft Exchange Server and Lotus Notes. (POP3 is further described in publicly available IETF RFC 1939, "Post Office Protocol—Version 3", May, 1996.) Thus, mail host 116 supports both inbound and outbound electronic messaging.

Optionally connected to authenticated message server 112 via a hyper text transfer protocol ("HTTP") link is an administration interface 124. (HTTP is further described in publicly available Internet RFC 1945, which is incorporated herein by reference in its entirety.) An administrator is able to configure the authenticated message server 112 via a web browser or equivalent device through data exchanges via HTTP and the administration interface 124.

Users are able to connect to the mail host 116 via a POP3 or an SMTP connection by way of one or more user e-mail clients 120. Embodiments of e-mail clients include the Netscape Communicator available from Netscape Corporation <http://www.netscape.com> in Mountain View, Calif. and the Microsoft Outlook client, available from Microsoft Corporation <http://www.microsoft.com> in Redmond, Wash.

Figure 2:
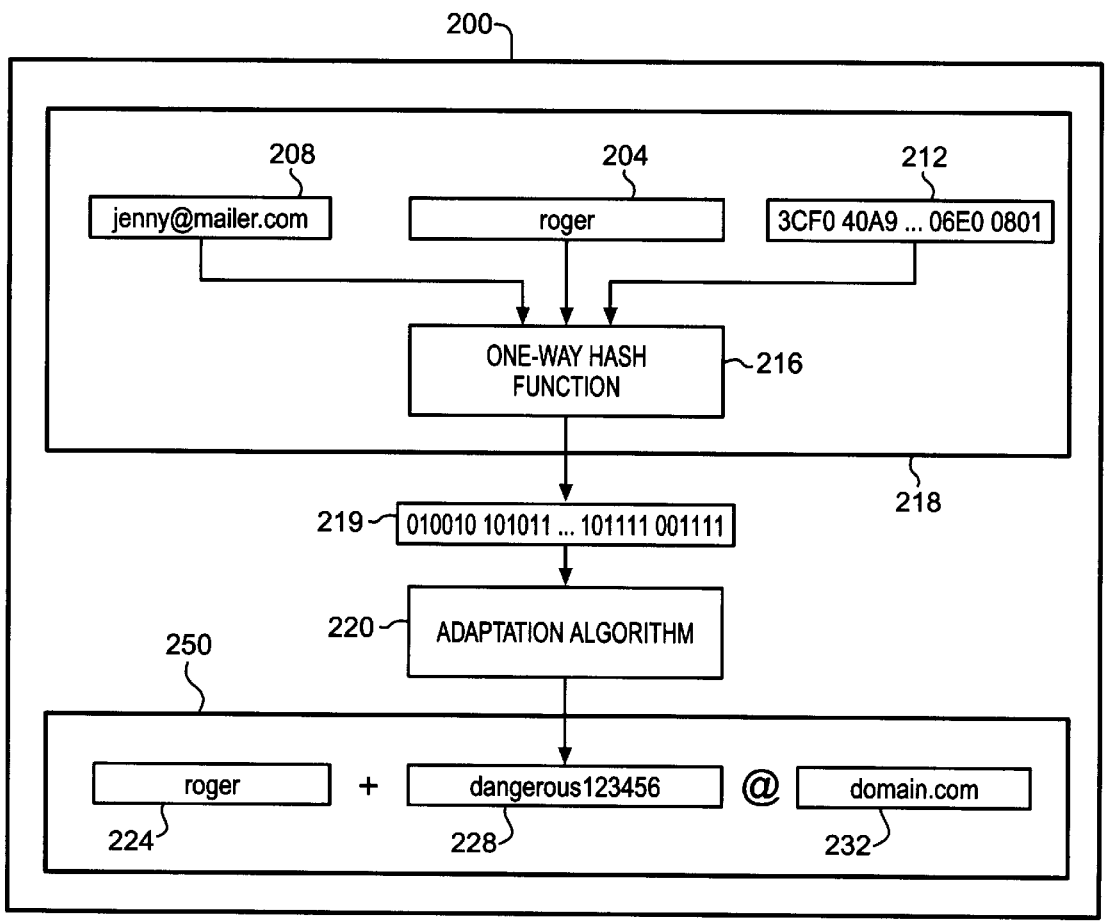
FIG. 2 depicts a functional overview of an authenticated message server.

FIG. 2 depicts a functional overview of authenticated message server 200. Embodiments of digital signature engine 218 are further described in U.S. application Ser. Nos. 09/133,875, filed Aug. 14, 1998, now U.S. Pat. No. 6,356,935 and, U.S. application Ser. No. 09/134,133 filed Aug. 14, 1998, now U.S. Pat. No. 6,085,321 which have been incorporated herein by reference in their entirety. The digital signature engine 200 is preferably embodied in the authenticated message server 112. It is noted that the adaptation algorithm 220 is different in the present invention than in the previous applications. An improvement in the adaptation algorithm is described below with reference to FIG. 3. Moreover, the authenticated electronic userid 250 is different from the previous application. Minor modifications include the use of a plus sign "+"delineator rather than a period between the local userid 224 and the adapted digital signature 228. Significantly, the adapted digital signature 228 is no longer an unrememberable value, but rather a rememberable value.

Figure 3:
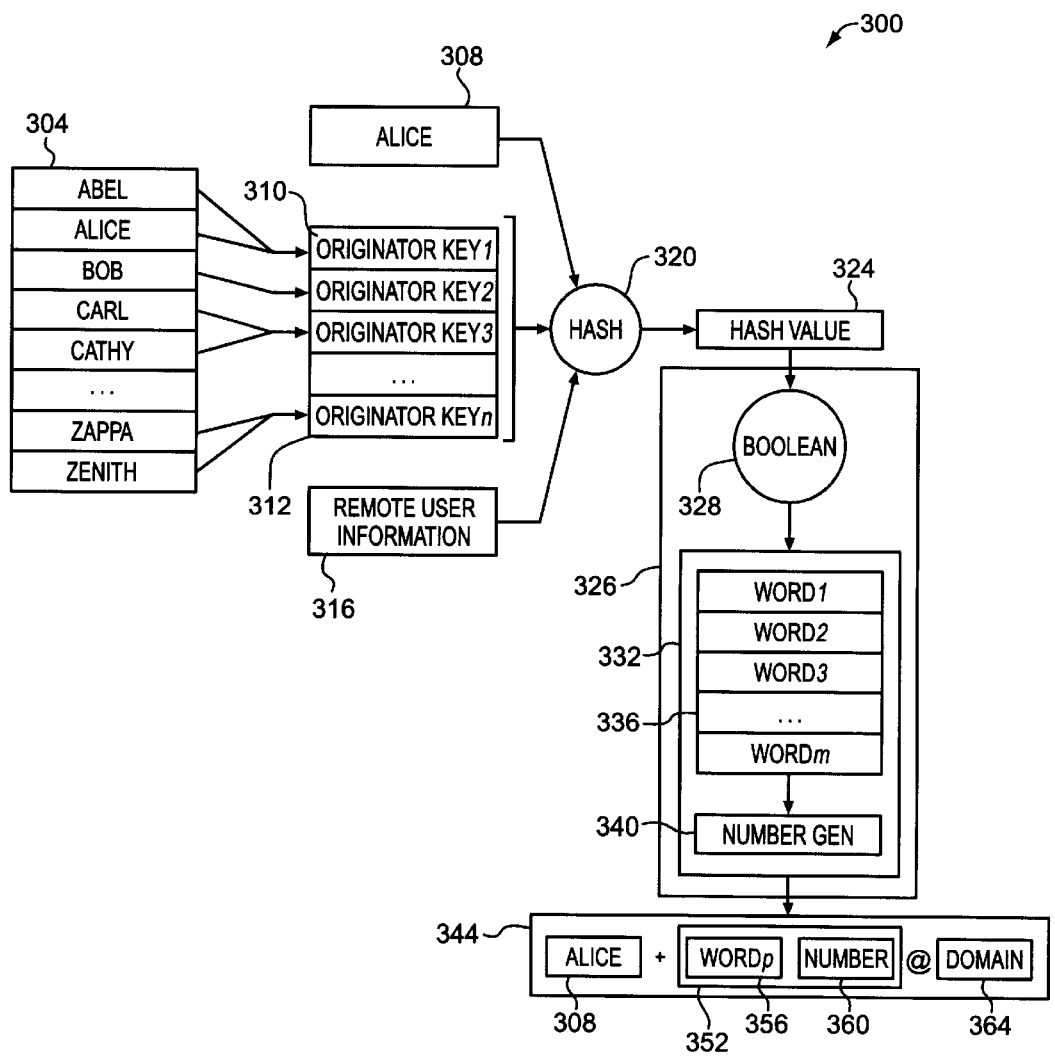
FIG. 3 depicts a presently preferred adapted digital signature technique.

FIG. 3 depicts a preferred embodiment of the adapted digital signature techniques of the present invention. A local userid list 304 is shown to illustrate the relationship between local userids and originator keys—shown in originator key list 312.

According to a presently preferred embodiment, thirty-seven originator keys are used, each originator key having a one-to-many relationship with local userids 304. The first character of local userids 304 determines which originator key is associated with it. Twenty-six keys are reserved for letters A–Z (case insensitive), ten for numbers 0–9, and a miscellaneous key for characters not matching the first thirty-six values. According to an alternative embodiment, any number of originator keys, n, can be used. In yet another embodiment, a database can be maintained by the mail host 116 or the authenticated message server 112 that identifies local userids and their preferences (e.g., always reject messages having an invalid adapted digital signature). If each local userid is allowed one or more originator keys, then the database can store them.

Digital signature engine 218, shown as hash function 320 (preferably the MD5 function), combines a local userid 308, "Alice", with Alice's corresponding originator key 310 and remote user information 316. Remote user information includes at least a domain name and can also include the remote userid. The output of the digital signature engine 218 (shown here hash function 320) is a digital signature (or "hash value" 324, as the case may be). The digital signature is a 128-bit value. The adaptation algorithm 326 then modifies the digital signature.

Adaptation algorithm 326 first performs a boolean function 328 on the hash value 324. The extent to which the hash value 324 is modified depends on the size of a word list 336. According to a presently preferred embodiment, the word list is 4096 words long (as used herein, "words" does not refer to a length of a value, rather it refers to the value itself—a word in the word list can be virtually any length), however, the word list 336 can be any length, m, depending on the degree of security desired (the more words, the greater the security). Since 4096 words are in the word list, the extent of the modification is such that it yields a value that is equal to or greater than the number of words, m, in the word list 336. The boolean function 328 modifies the hash value 324 into a 12-bit value referred to herein as a "modified digital signature", or more specifically a "modified hash value". In one embodiment, the boolean function 328 selects the first twelve bits as the modified hash value. In another embodiment, AND or OR functions can combine one or more preset bit masks to generate the modified hash value.

The modified hash value from the boolean function 328 is passed to the adapted digital signature selector 332. The adapted digital signature selector 332 includes the word list 336 and, optionally, a number generator 340. The adapted digital signature selector 332 selects a particular word from the word list 336 using the modified hash value from the boolean function 328.

According to one embodiment, a modulus function (e.g., the C language modf function or % operator) is applied to the modified hash value, the base being the number of words, m, in the word list 336. If the modulus function returns zero, then the adapted digital signature selector 332 retrieves a word corresponding to (i.e., indexed to) the modified hash value. However, if the modulus function returns a value other than zero, then the adapted digital signature selector 332 retrieves a word corresponding to the value returned by the modulus function (e.g., the remainder).

For example, if the modified hash value is 3 and there are 5 words in the word list 336, then word3 is the word selected from the word list 336. However, if the modified hash value is 7 and there are 5 words in the word list 336, then word2 is the word selected from the word list 336.

The number generator 340 generates a calculated number, a preset number (e.g., identifying a status or mode for the adapted digital signature 352), or any combination thereof. Preferably, the number generator 340 generates a number based on the remaining 116 bits from the digital signature (or hash value 324). According to one embodiment, a six digit ASCII number is generated. The first digit corresponds to the mode of the adapted digital signature (e.g., which set of remote user information was used as an input to the digital signature engine 218—the remote user domain name, or the remote userid and domain name). The subsequent five digits are based upon a bit pattern of the unused portion of the hash value 324. For example, sixteen bits of the 116 bits can be selected and a combination of those sixteen bits can be turned into the five digit number.

The value 360 generated by the number generator 340 is appended to the word 356 selected from the word list 336 to form the adapted digital signature 352. The adapted digital signature 352 is concatenated with a local userid 308 and a domain name 364 to form the authenticated electronic userid 344. A delineator (e.g., "+") separates the local userid 308 from the adapted digital signature 352, while the at sign ("@") separates the adapted digital signature 352 from the domain name 364. Of course, other delineators, such as the minus sign ("–"), the underscore ("_"), the period ("."), the equal sign ("=") or fixed length values can be used to delineate the address information.

If added security is desired, then the word list 336 can be bit-wise barrel-shifted or otherwise scrambled so that the values in the word list 336 cannot be casually copied. Accordingly, the scrambled value can be converted by the adaptation algorithm 326 when the word is needed, or just before concatenation of the adapted digital signature 352 to form the authenticated electronic userid 344.

Figure 4:
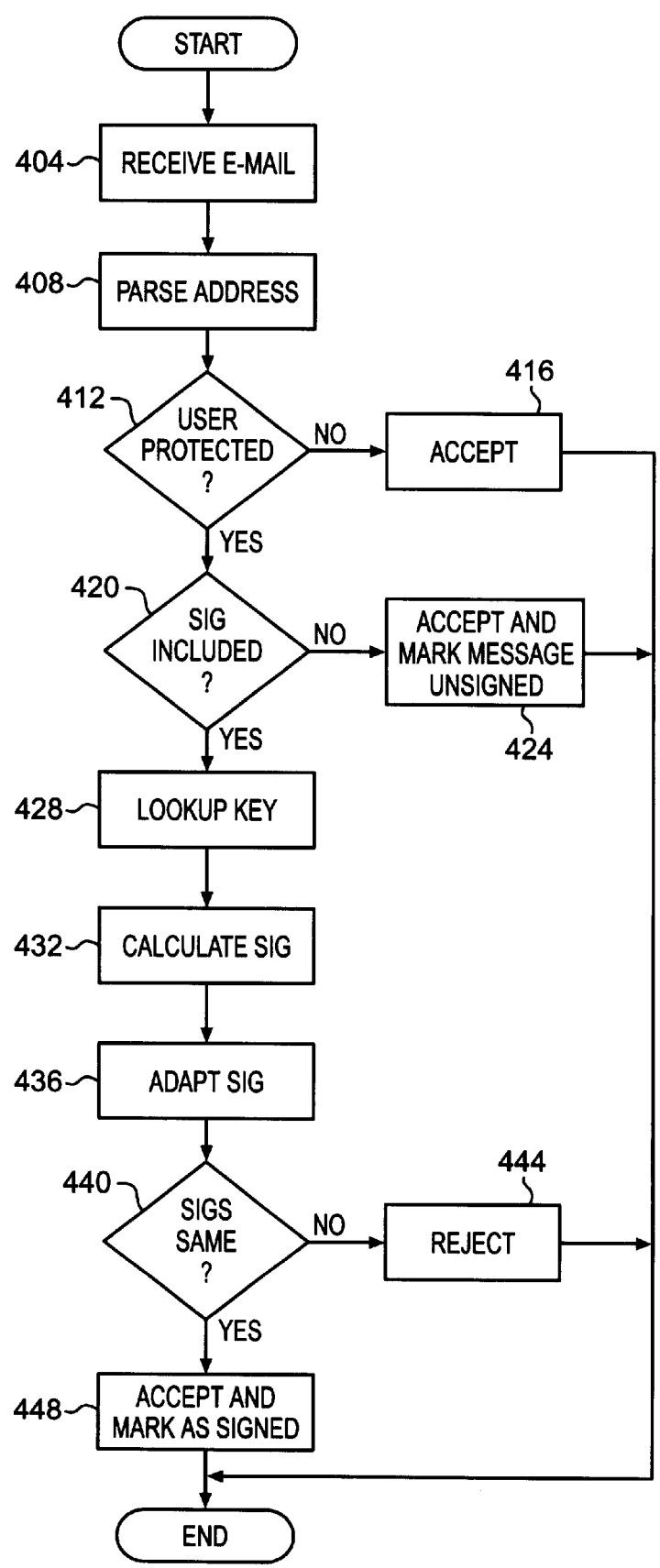
FIG. 4 is a flowchart depicting steps for authenticating an inbound electronic message comprising an adapted digital signature.

FIG. 4 depicts a method for processing an inbound electronic message comprising an adapted digital signature 352.

In act 404, an inbound electronic message is received over the internet 104 at the mail exchanger 108. According to one embodiment, the inbound electronic message comprises message header information, such as an SMTP "MAIL From" address and an SMTP "RCPT To" address. In act 408, authenticated message server 112 parses the "to:" field ("receiver" information) from the address information (e.g., the "RCPT To" information in the SMTP message) to identify a local userid and, possibly, an adapted digital signature. The "from:" field ("remote user" or "sender" information) can also be parsed in act 408. Next, in act 412, a test is performed on the receiver information to determine whether an associated local userid is protected by the authenticated message server 112. If the associated local userid is not protected, then in act 416, the message is accepted and passed on to the mail host 116. If the associated userid is protected, then processing continues to act 420.

In act 420, the authenticated message server 112 tests the receiver information parsed in act 408 to determine whether the receiver information comprises an adapted digital signature 352. If the receiver information does not include an adapted digital signature 352, then in act 424 the message is conditionally accepted but marked as unsigned. In one embodiment, if a local user or the administrator has configured the authenticated message server 112 to reject all unsigned messages, then a receipt log record is made recording the message header information and the message is then purged. However, in another embodiment, the administrator, or the local user may specify that unsigned messages must be queued to a particular location for later manual review. If the receiver information does include an adapted digital signature 352 then processing continues to act 428.

In act 428, a key lookup is performed. According to one embodiment, a key lookup includes matching a local userid (e.g., from the local userid list 304) with the local userid in the authenticated electronic userid (that is, the portion of the userid before the "+") and then retrieving the corresponding originator key from the originator key list 312. In act 432, the remote user information 316, together with the retrieved originator key (e.g., originator key 310) and the local userid 308 are used to calculate a hash value 324 with the hash function 320.

It is important to note that if mode information is contained in the inbound adapted digital signature, then the particular remote user information used by the hash function 320 will vary. Thus, according to one embodiment, the first digit of the number 360 will determine which remote user information to include as an input to the hash function 320.

In act 436, the adaptation algorithm 326 adapts the hash value 324 to form an adapted digital signature 352 (e.g., the word 356 and number 360). In act 440, the newly created adapted digital signature is compared with the adapted digital signature in the inbound e-mail message receiver information. If the two adapted digital signatures match, then processing continues to act 448. However, if the two adapted digital signatures do not match, then the inbound e-mail message is rejected by the authenticated message server 112.

In act 448, the inbound e-mail message is accepted by the authenticated message server 112 and marked as signed. Once the inbound e-mail message is marked as signed, it can be passed to the mail host 116 for access by the user e-mail client 120.

According to one embodiment, the word list 336 is not configurable after set up of the authenticated message server 112. Rather, the word list 336 is must be modified prior to initialization of the authenticated message server 112. However, if a post set up modifiable word list is desired, then a substitution list can be maintained. According to one embodiment, the substitution list is a two field, multi-row table configured to hold a first word and a second word in each row. A removed word field (column) holds the word that was removed from the word list 336 and a new word field (column) holds the new word substituted for the replaced word.

Thus, when an inbound e-mail message is received at the authenticated message server 112 the authentication process can further involve testing the substitution list to determine whether the word 356 in the adapted digital signature 352 is a word in the removed word field of the substitution list. If the word 356 is in the removed word field of the substitution list, then when the adaptation algorithm is performed the word selected by the adapted digital signature selector 332 from the word list 336 is matched with a word in the new word field in the substitution list. The word selected by the adapted digital signature selector 332 from the word list 336 is then replaced with the word in the replaced word field of the substitution list.

According to one embodiment of the invention, the electronic message body is not accepted via the SMTP process unless the authenticated message server 112 verifies the adapted digital signature. Such an embodiment saves bandwidth. However, according to an alternative embodiment, the authenticated message server 112 verifies the adapted digital signature after the message body is (conditionally) accepted.

In still another embodiment, the functionality of the mail exchanger 108 can be incorporated into the authenticated message server 112.

The present invention is particularly useful as a spam (or junk e-mail) filter. Advantages of the present invention include that it integrates into existing electronic messaging infrastructure (e.g., SMTP and POP3 systems) without requiring additional hardware or software by both the sender and receiver. There is no need to share proprietary encryption/decryption algorithms or keys between a message sender and recipient as in traditional symmetric or asymmetric encryption algorithms. Further, it greatly reduces the chance of spoofing by a spammer by verifying the recipient information without requiring a handshake or real-time connection between a sender and a recipient. Finally, the present invention does not rely on complicated linguistic or content-based rules for filtering spam. Rather, the invention can be realized without reference to the content of the inbound message body.

What is claimed is:

1. A method for creating an adapted digital signature comprising:

retrieving an originator key, said originator key corresponding to a local userid;

running a digital signature engine to create a digital signature, said digital signature based on at least said originator key and remote user information;

retrieving a word from a word list, said word corresponding to at least a portion of said digital signature; and returning at least said word as said adapted digital signature.

2. The method of claim 1, further comprising performing a boolean function on said digital signature to create a modified digital signature, and wherein said word is retrieved based upon said modified digital signature.

3. The method of claim 1, further comprising generating a number; and appending said number to said word form said adapted digital signature.

4. The method of claim 1, further comprising concatenating said adapted digital signature with said local userid and a domain name.

5. The method of claim 1, wherein running said digital signature engine includes performing a one-way hash function, said one-way hash function using at least said originator key and said remote user information, said one-way hash function generating a hash value, and said hash value being said digital signature.

6. A method for verifying an adapted digital signature comprising:

retrieving an originator key based on a first portion of address information;

generating an adapted digital signature, said act of generating comprising:

creating a digital signature based on at least said originator key and a second portion of said address information;

retrieving a word from a word list, said word corresponding to said digital signature; and returning at least said word as said adapted digital signature;

comparing a third portion of said address information to said adapted digital signature; and accepting said electronic message if said third portion of said address information and said adapted digital signature match.

7. The method of claim 6, further comprising:

testing said first portion of said address information to determine whether a local user identified by said receiver information employs authenticated message server services; and accepting said electronic message if said local user does not employ said authenticated message server services.

8. The method of claim 6, wherein said second portion of said address information includes a sender domain name and said first portion of said address information includes a local userid.

9. The method of claim 6, wherein generating said adapted digital signature further comprises:

creating a modified digital signature from said digital signature, said modified digital signature created with a boolean function, and wherein said word is retrieved from said word list based upon said modified digital signature;

generating a number; and appending said number to said word.

10. The method of claim 6, wherein creating said digital signature includes executing a one-way hash function, said one-way hash function using at least said originator key and said second portion of said address information, said one-way hash function generating a hash value, and said hash value being said digital signature.

11. A electronic message system comprising:

an authenticated message server, said authenticated message server configured to remove an inbound electronic message if an authenticated electronic userid cannot be verified, said inbound electronic message including address information; and a mail host coupled to said authenticated message server;

wherein said authenticated message server is configured to remove said inbound electronic message by performing the acts of:

generating an adapted digital signature, said act of generating comprising:

creating a digital signature based on at least an originator key and a first portion of said address information;

retrieving a word from a word list, said word corresponding to said digital signature; and returning said word as said adapted digital signature;

comparing a second portion of said address information to said adapted digital signature; and rejecting said inbound electronic message if said second portion of said address information and said adapted digital signature do not match.

12. The electronic message system of claim 11, further comprising a mail exchanger coupled to said authenticated message server and configured to receive said inbound electronic message.

13. The electronic message system of claim 11, wherein said authenticated message server is configured to perform the act of parsing sender information and receiver information from said address information, said receiver information including a local userid and a second adapted digital signature.

14. The electronic message system of claim 11, wherein creating said digital signature includes executing a one-way hash function, said one-way hash function using at least said originator key and a portion of said address information, said one-way hash function generating a hash value, and said hash value being said digital signature.

15. The electronic message system of claim 11, wherein said act of generating said adapted digital signature further comprises performing a boolean function on said digital signature to create a modified digital signature, and wherein said word is retrieved based on said modified digital signature.

16. The electronic message system of claim 11, wherein said authenticated message server is further configured to perform the acts of:

generating a number; and appending said number to said word to form said adapted digital signature.

* * * * *